United States Patent [19]
Iwata et al.

[11] 3,916,285
[45] Oct. 28, 1975

[54] GENERATION OF GATE PULSES FOR CONTROL OF PWM THYRISTOR INVERTER

[75] Inventors: Masahiko Iwata, Toyohashi; Hitoshi Kawano, Ise, both of Japan

[73] Assignee: Shinko Electric Co., Ltd., Tokyo, Japan

[22] Filed: Sept. 11, 1974

[21] Appl. No.: 505,061

[30] Foreign Application Priority Data
Dec. 18, 1973 Japan.............................. 48-142782

[52] U.S. Cl...................... 321/9 A; 321/18; 321/40
[51] Int. Cl.² ........................................... H02M 1/12
[58] Field of Search ........ 321/9 A, 16, 18, 40, 45 R

[56] References Cited
UNITED STATES PATENTS

| | | | |
|---|---|---|---|
| 3,406,328 | 10/1968 | Studtmann......................... | 321/9 A |
| 3,559,028 | 1/1971 | Studtmann et al................. | 321/9 A |
| 3,585,488 | 6/1971 | Gutt et al............................ | 321/9 A |

*Primary Examiner*—William M. Shoop
*Attorney, Agent, or Firm*—Kurt Kelman

[57] ABSTRACT

A set of timed gate pulse series for control of a PWM thyristor inverter is generated through the steps of generating three phased series of triangular waveform signals the repetition frequencies of which are proportional to the level of an input command and have a ratio therebetween of 4:2:1, level-comparing the three series of triangular waveform signals with the input command and, on the basis of crossover points therebetween, generating three series of pulses having a pulse width ratio therebetween of 1:2:4, selecting one of the three series of the generated pulses depending upon the level of the input command, and converting the selected series of pulses to a set of desired timed gate pulse series for control of the PWM thyristor inverter.

11 Claims, 8 Drawing Figures

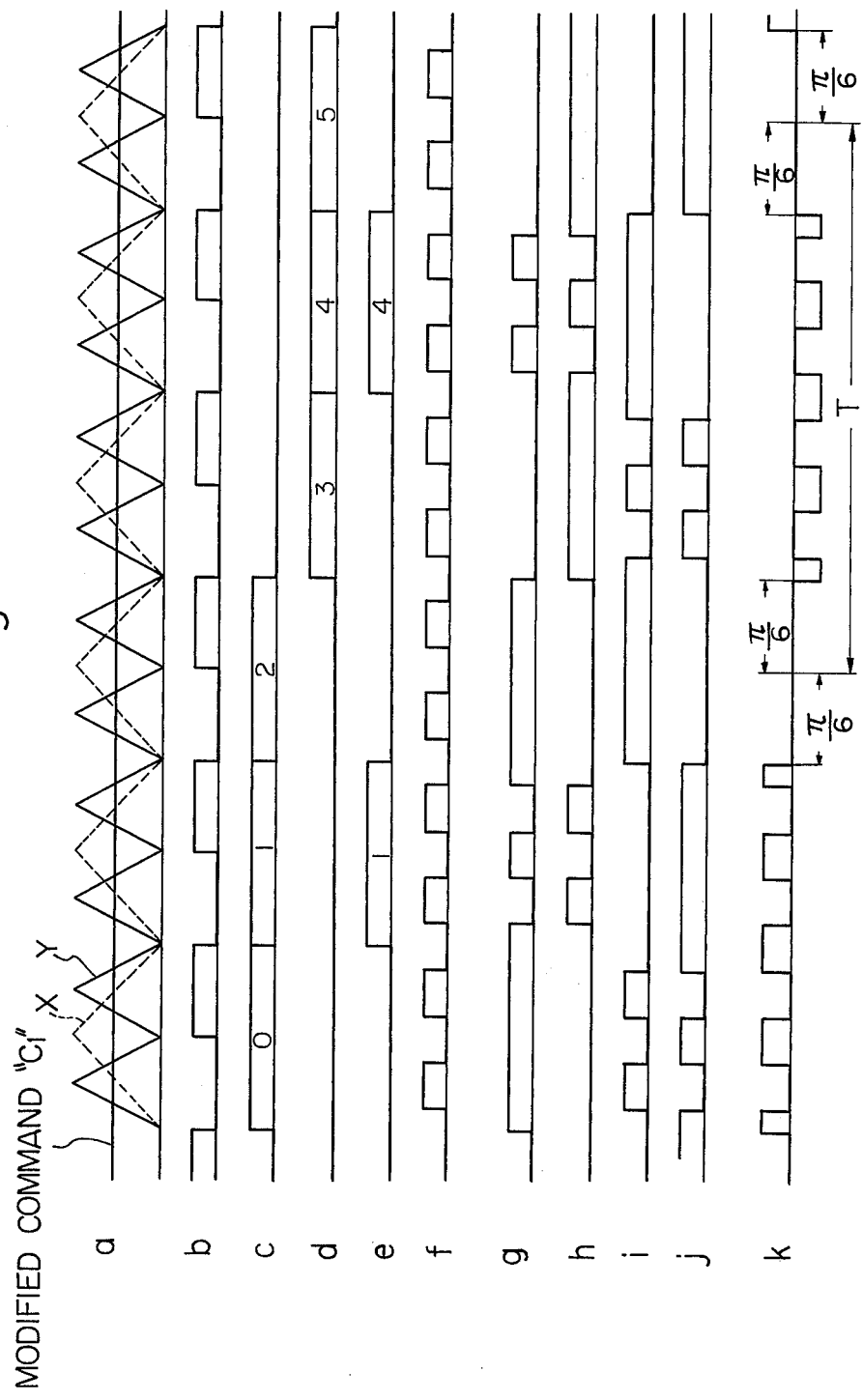

GENERATION OF GATE PULSES FOR CONTROL OF PWM THYRISTOR INVERTER

BACKGROUND OF THE INVENTION

This invention relates to control of an inverter and, more particularly, to a method and an apparatus for generating trigger or gate pulse series for control of a PWM (Pulse Width Modulated) thyristor inverter in response to an input command designating a desired inverter output frequency.

A PWM inverter, which typically includes a set of thyristors as switching elements which are rendered conductive by application of width modulated pulses, is preferably used as an A.C. power source to energize an A.C. motor and control its speed over a wide range. In such applications, it is generally necessary that the amplitude of the fundamental A.C. component of the inverter output is proportional to the output frequency.

As a measure of realizing the above requirement, it was known to keep the total duration or total ON time per half cycle of inverter output voltage pulses unchanged irrespective of what frequency the inverter provides. According to this known scheme, however, the inverter output frequency is varied with no change in number of voltage output pulses appearing in each half cycle and no change in pulse width measured on a real time scale. Thus, as the frequency is shifted toward a higher range the rest interval or space time between adjacent pulses approaches the critical turn-off time of a given thyristor and will become shorter than the same. As a result, it will be seen that the upper limit of inverter operable frequencies depends upon the commutation property of thyristors employed as the switching elements in the inverter.

To overcome the difficulty of the foregoing technique, another method was proposed which decreases the number of voltage pulses appearing each half cycle step by step as the inverter frequency is to be increased and, ultimately, at a predetermined operation point, changes the inverter output to a square waveform signal or a single voltage pulse (having no inter-pulse space) during half cycle. This proposal is preferable in that it substantially avoids the limitation of operation frequency. However, complicated circuits and arrangement are required to realize the above feature and, particularly, it is almost impossible to eliminate "discontinuity" of output voltage mean value and frequency appearable at the operation point where the number of voltage pulses per half cycle is switched from one integral to another integral. Details of such prior art will be seen in (1) B. Mokrytzki "Pulse Width Modulated Inverters for AC Motor Drives" IEEE Transactions on Industry and General Applications, vol. IGA–3, No. 6, Nov/Dec 1967, pages 493 to 503; and (2) P. B. Mensnieff "Solid-State Adjustable-Frequency AC Drives", Control Engineering, Nov. 1971, pages 57 to 70.

SUMMARY OF THE INVENTION

Therefore, it is an object of the present invention to provide a method and an apparatus for control of a PWM inverter.

It is a specific object of the present invention to provide a method and an apparatus for generating a set of gate pulse series for control of a PWM thyristor inverter in response to an input command designating an output frequency, with the inverter output voltage mean value as well as frequency and phase varying linearly without discontinuity over an operation range.

It is another object of the present invention to provide a simple, economical apparatus for generating a set of gate pulse series for control of a PWM thyristor inverter.

It is a still further object of the present invention to provide a method and an apparatus for generating three timed sets of gate pulse series for control of a three-phase PWM thyristor inverter.

To achieve the above objects, the present invention provides a novel method of generating a set of gate pulse series for control of a PWM thyristor inverter, which comprises the steps of generating three phased series of triangular waveform signals the repetition frequencies of which are proportional to the level of an input command, designating the inverter output frequency, and having a ratio therebetween of 4:2:1, comparing in terms of level the three series of triangular waveform signals with the input command and, on the basis of crossover points therebetween, generating three series of pulses having a pulse width ratio therebetween of 1:2:4, selecting one of the three series of the generated pulses depending upon the level of the input command, and converting the selected series of pulses to a set of desired timed gate pulse series for control of the PWM inverter thyristors. Preferably, the number of resultant voltage pulses per half cycle is switched from 9 to 5, then to 3 as the output frequency increases. In higher frequencies, a single square waveform voltage is generated for each half cycle.

An apparatus according to the present invention comprises three triangular waveform generators responsive to an input command designating the inverter output frequency to generate three phased series of triangular waveform signals whose repetition frequencies are proportional to the level of the input command and having the repetition frequency ratio of 4:2:1; three comparators for level-comparing the respective series of triangular waveform signals with the input command to find respective crossover points therebetween and providing three series of pulses having therebetween a pulse width ratio of 1:2:4; an operation zone selector circuit for comparing the level of the input command with predetermined zone set levels to provide a bit signal which identifies one of three operation zones that is to be assumed by the inverter; a matrix circuit responsive to the bit signal to chose one of the three series of pulses provided by the comparators; and means operable in synchronism with the triangular waveform generators for converting the chosen series of pulses to a set of desired timed gate pulse series for control of the inverter thyristors. Preferably, the number of resultant output voltage pulses per half cycle is nine in low frequencies, five in medium frequencies, and three in high frequencies. At frequencies above the three operation zones, preferably, a single square waveform voltage is generated each half cycle.

In case of a three-phase PWM thyristor inverter, means are provided to derive, from the chosen series of pulses provided by the matrix circuit, three sets of timed gate pulse series having the difference in electric angle of 120° or 240° therebetween.

Other objects and advantages of the present invention will in part be obvious and will in part appear hereinafter.

BRIEF DESCRIPTION OF THE DRAWINGS

FIG. 7 is a time chart used for easy understanding of an illustrative operation of the circuit shown in FIG. 5.

DESCRIPTION OF THE PREFERRED EMBODIMENT

In describing the preferred embodiment of the present invention, it is assumed that a PWM thyristor inverter is operated in one of three or four operation modes or zones depending upon a given level of an input command designating a desired inverter output frequency. And, as will become clear as the description proceeds, the present invention provides a set (in case of the single phase) or sets (in case of three phases) of gate pulse series to control thyristors of the inverter, which gate pulses "inherently" preserve "continuity" of mean value for a given interval. Such gate pulses control turn-on and turn-off of the thyristors to cause the thyristors to convert a D.C. power to an A.C. power of single or three phases possessing also "continuity".

Figure 1:
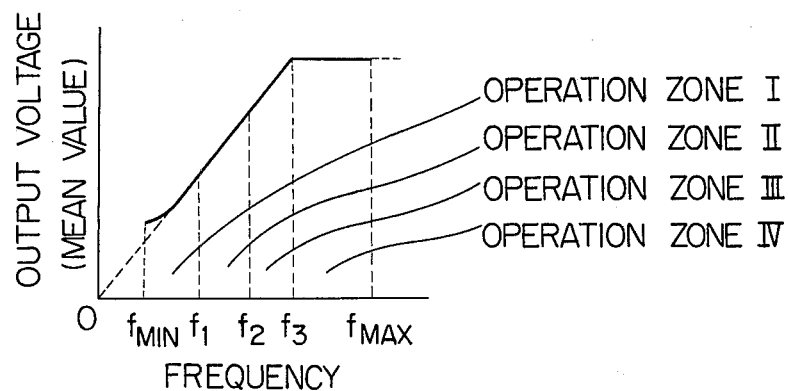
FIG. 1 is a characteristic graph illustrating one exemplary relation between A.C. output voltage mean value (on the ordinate) and output frequency (on the abscissa) of a PWM inverter controlled in accordance with the teaching of the present invention.

FIG. 1 illustrates one exemplary relation between A.C. output voltage mean value and frequency of a PWM thyristor inverter controlled in accordance with the present invention. On a desired operation range of the inverter between frequencies $f_{MIN}$ and $f_{MAX}$, for convenience, the first part between $f_{MIN}$ and $f_1$ is named operation zone I, similarly, between $f_1$ and $f_2$, is named operation zone II between $f_2$ and $f_3$ is named operation zone III, and between $f_3$ and $f_{MAX}$ is named operation zone IV.

Frequency $f_3$ is determined considering the commutation property or critical turn-off time of thyristors employed in the inverter and the acceptable ratio of higher harmonic components to the fundamental of the A.C. output. That is, above frequency $f_3$ or in operation zone IV, the output voltage is changed to a single square waveform per half cycle to have no inter-pulse rest time, so that the output voltage mean value has a certain fixed value in operation zone IV because the voltage pulse width is fixed in electric angle per half cycle.

Between $f_{MIN}$ and $f_3$ the output voltage mean value changes substantially in proportion to frequency variation. However, on approaching $f_{MIN}$ the D.C. resistance of a motor winding generally becomes effective to decrease a torque due to increasing loss. Thus, in practical applications, in order to compensate for such torque decrease, the curve of output mean value versus frequency is slightly offset above the straight proportionate line, as shown in FIG. 1 at and around $f_{MIN}$.

Figure 2:
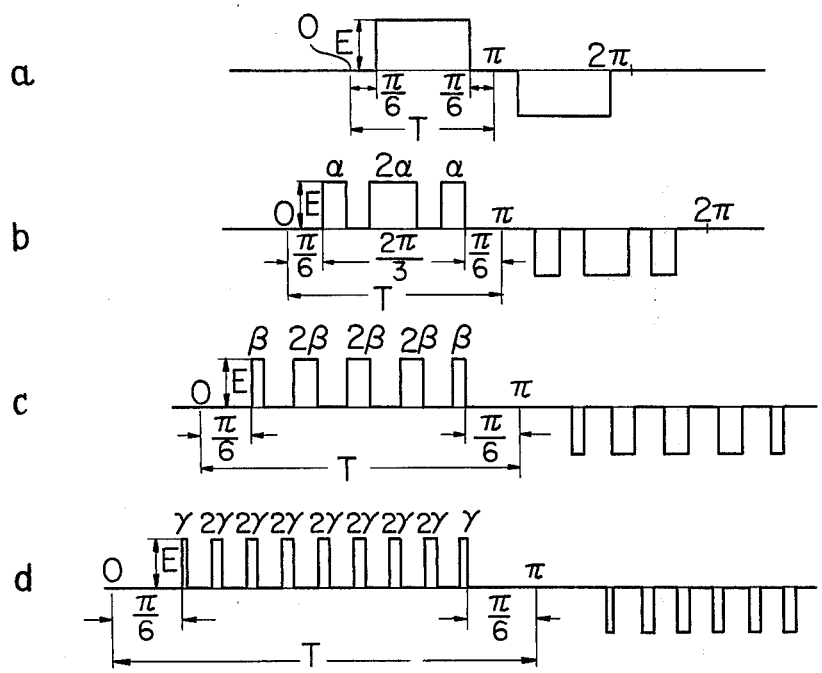
FIG. 2 is a time chart illustrating four pulse trains different in pulse width and in number of pulses per half cycle wherein T represents the interval of half cycle.

To show the difference in operation between the four operation zones, reference is made to a time chart of FIG. 2. FIG. 2 illustrates four voltage pulse trains $a$, $b$, $c$ and $d$, wherein E is the amplitude of each pulse, T is the period of half cycle of the inverter A.C. output, and the interval of $\pi/6$ appearing on either end of each half cycle represents a quiescent or space interval provided for reduction of higher harmonics as well known in the art.

Pulse trains $a$, $b$, $c$ and $d$ of FIG. 2 represent the inverter output when it is operating in operation zones IV, III, II and I, respectively.

Specifically, in a lower range or operation zone I the inverter is operated to provide nine voltage pulses per half cycle for the purpose of increasing the number of order of higher harmonic components contributing to the inverter output or reducing the magnitude of smaller-order higher harmonic components to thereby lighten influence of higher harmonic components upon the motor to be powered. As frequency increases and the operation zone is switched to II and then to III, the number of voltage pulses per half cycle is changed from nine to five and then, from five to three, because of the limitation due to the commutation property of the thyristors relative to the inter-pulse space time. In the final operation zone, IV, the inverter is operated so as to provide a single square waveform voltage pulse each half cycle.

Under variation in operation frequency, it is required that the output voltage mean value change continuously even at the point where the operation zone is switched over as well as within the respective operation zone.

To meet the above requirement, according to the present invention, the ratio of pulse width measured on same real time scale among three pulse trains $b$, $c$ and $d$ of FIG. 2 is selected as $$\alpha : \beta : \gamma = 4 : 2 : 1;$$

thus, considering the number of pulses in a respective pulse train during half cycle or period T, any one of pulse trains $b$, $c$ and $d$ gives the same voltage mean value formula of $4\alpha E/T$. If respective pulse trains have the same half period, T, or give the same inverter output frequency, the three pulse trains provide the same voltage mean value.

Accordingly, at change-over frequency $f_1$ between operation zones I and II shown in FIG. 1, for example, pulse trains $d$ and $c$ of FIG. 2 give the same voltage mean value because of the same period, T, so that either pulse train $d$ or $c$ can be employed at frequency $f_1$ and no discontinuity appears in the voltage mean value of the inverter output even when pulse train $d$ is replaced by train $c$ and vice versa. This is also true at the point of change-over between operation zones II and III or at frequency $f_2$. It will be understood that a practical value of change-over frequency $f_1$ or $f_2$ will be determined considering the relation between the inter-pulse rest time of respective pulse trains and the thyristor commutation time limit.

Similarly, frequency $f_3$ between operation zones III and IV, or the operation point when three-pulse train $b$ is to be replaced by single-pulse train $a$ or the square waveform, will be determined considering whether the inter-pulse rest time of pulse train $b$ is longer or shorter than the required thyristor commutation time. It is not necessary to state that a slight shock will appear in the inverter output voltage mean value when operation zone III is switched to IV and vice versa.

In the foregoing, what type of voltage pulse is desirable was described. Now, how such pulse is generated will be explained.

Figure 3A:
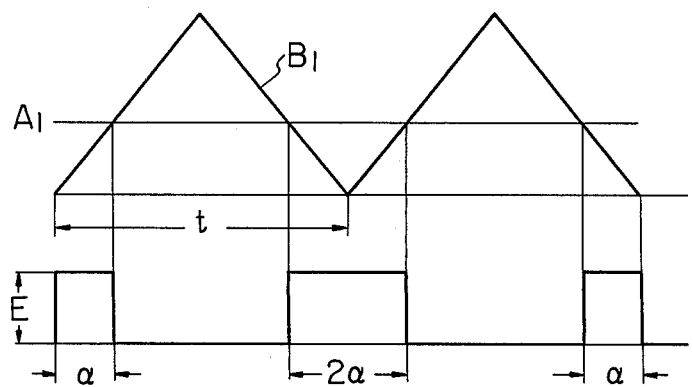
FIGS. 3a and 3b show schematically the idea of giving a proportional relation between a given output frequency and a mean value of an inverter output A.C. voltage that is employed in the present invention.
Figure 3B:
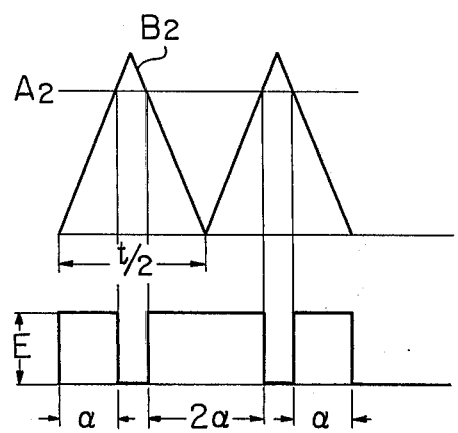

First, referring to FIGS. 3a and 3b, the provision of giving a proportional relation between voltage pulse mean value and inverter output frequency will be described. In FIGS. 3a and 3b, an input command instructing the inverter output frequency is designated by A1 in FIG. 3a and A2 in FIG. 3b, having different levels. Triangular waveform signal series B1 and B2 are generated so as to have repetition frequencies determined by the levels of input commands A1 and A2, respectively. Specifically, the repetition frequency of a generated triangular waveform signal series is made directly proportional to a given level of the input command.

As for example, the level of command A2 of FIG. 3b is selected to be twice the level of A1 shown in FIG. 3a; thus, the period, $t/2$, of one triangle of signal series B2 becomes a half of the corresponding period, $t$, of signal series B1.

According to the present invention, a series of desired (voltage) pulses is generated by comparing in terms of level the given input command and the correspondingly generated series of triangular waveform signals, or on the basis of crossover points between the input command and the generated triangular series. As a result, as shown in FIGS. 3a and 3b, respective combinations of the input command and triangular series give pulse trains which are equal in pulse width on the same time scale, but differ in inter-pulse rest time. If a voltage mean value for the period of two triangles is calculated, the pulse train of FIG. 3a gives the value of $4\alpha\lambda E/2t$, while FIG. 3b gives the value of $4\alpha E/t$. That is, the voltage mean value in case of command A2 is twice the value due to command A1.

In brief, by generating a series of triangular waveform signals whose repetition frequency is proportional to the level of a given input command, a resultant series of voltage pulses has a mean value proportional to the command level, i.e., the inverter output frequency.

Now, referring to FIG. 4, the method of preserving "continuity" in voltage mean value, frequency and phase of the inverter output at the point of switch-over of the operation zones will be described.

Figure 4:
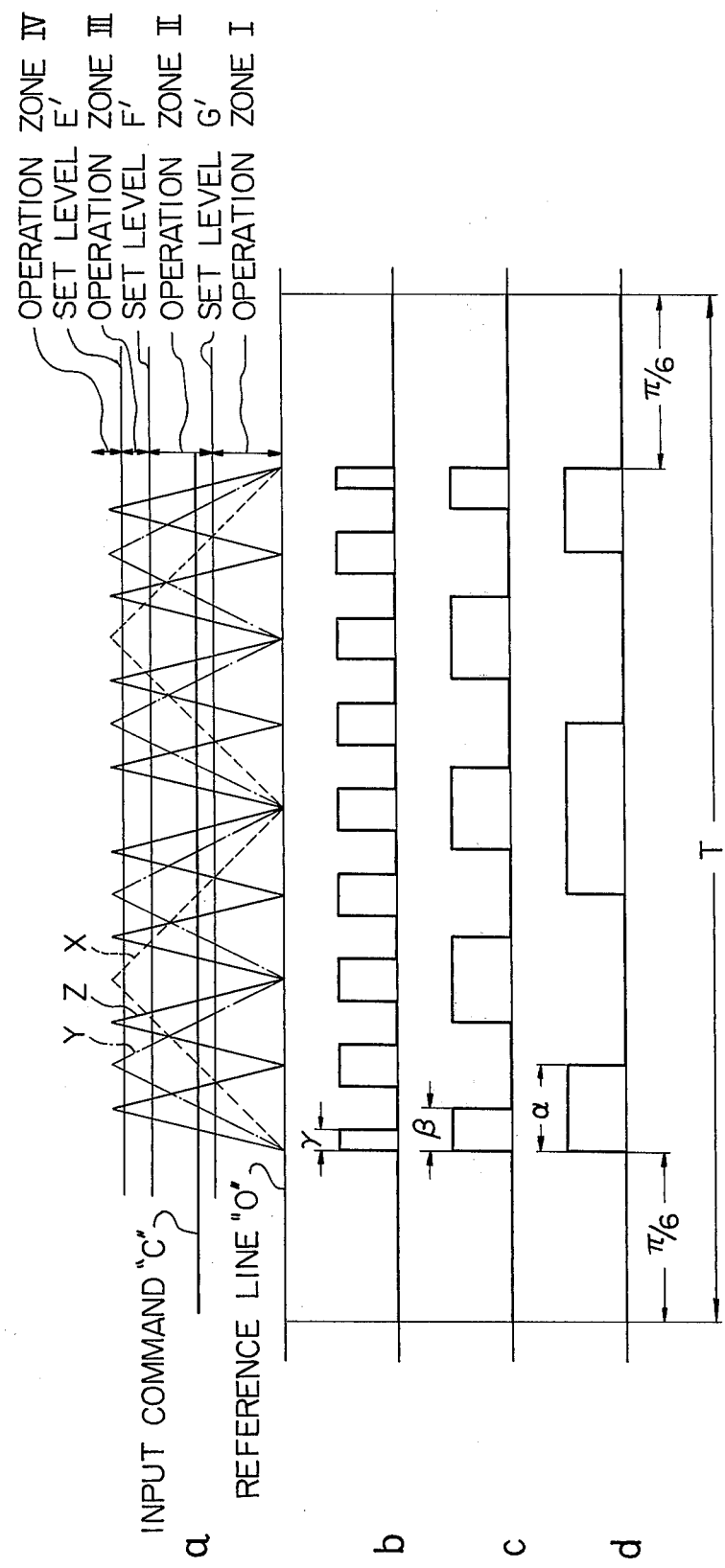
FIG. 4 is an explanatory drawing used to show the idea of preserving "continuity" of voltage mean value, frequency and phase of the inverter output at the point where the operation mode or zone of the inverter is switched from one to another, i.e., the number of output voltage pulses per half cycle is changed from one integral to a different integral.

In first column $a$ of FIG. 4, the input command is exemplarily illustrated by horizontal line "C" above reference line "O". As described in connection with FIG. 3, the present invention generates a triangular series whose repetition frequency is proportional to the given level of the input command. However, in FIG. 4, three series of triangular waveform signals are generated, identified by "X", "Y" and "Z". Specifically, triangular series X, Y and Z are effective when the inverter assumes operation zones I, II and III, respectively.

Other horizontal lines E', F' and G' shown in first column $a$ above the reference line "O" are predetermined set levels which are compared to the given level of the input command in a zone designation circuit hereinafter described to select one of the four operation zones depending upon the given input command. That is, if the input command has a level falling between set levels G' and F' or between set levels F' and E', operation zone II or III is assigned. It will be clear that operation zone I will be selected if the input command is below set level G', while operation zone IV will be selected if the input command is above set level E'.

In the example shown in FIG. 4, first column $a$, operation zone III may be selected because the input command "C" has a level falling between set levels G' and F'.

According to the present invention, three series of triangular waveform signals, X, Y and Z, are generated in response to the given input command; they are in phase and have repetition frequencies $f$, $2f$ and $4f$, respectively, where $f$ is proportional to the current level of the input command. As suggested in connection with FIG. 3, according to the present invention, the input command is compared with respective series of triangular waveform signals, X, Y and Z to produce three corresponding series of pulses, illustrated as waveforms $d$, $c$ and $b$ in FIG. 4.

It will be noted by inspecting FIG. 4 that the ratio of pulse width among the thus generated pulse series $d$, $c$ and $b$ satisfies always the relation:

$$\alpha : \beta : \gamma = 4 : 2 : 1.$$

As a result and considering the number of pulses of respective series during the period, T, with the quiescent interval, $\pi/6$, on either end of period T, all of pulse series $d$, $c$ and $b$ give the same mean value. Namely, so far as the inverter provides one of three pulse trains $b$, $c$ and $d$ shown in FIG. 4, no difference appears in voltage mean value even if the type of pulse train is changed.

Therefore, it can be stated that if the inverter is operated on the basis of the technique described above so as to provide pulse train $b$, $c$ or $d$ shown in FIG. 4 in response to which operation zone I, II or III the input command designates, the inverter preserves "continuity" in its output voltage mean value, frequency and phase while the input command changes in level at the operation point where the operation zone is switched over.

In operation zone IV the fundamental frequency of the inverter output varies with the change of the input command level. However, the output voltage mean value does not change in this zone IV. The reason is that, because change-over frequency $f_3$ is determined as the point where a possible inter-pulse rest time during half cycle is or may be equal to the critical commutation time of the thyristor, even if the inverter thyristor is caused to operate so as to provide pulses such as pulse train $d$ shown in FIG. 4, it does not turn off during an interval between adjacent pulses for each half cycle; rather it operates so as to provide pulse train $a$ shown in FIG. 2. At the point where operation zone III is switched to operation zone IV and vice versa, the inverter output is continuous relative to frequency and phase, but may produce discontinuity in voltage mean value.

The foregoing description with reference to FIGS. 1 through 4 is related to the desired inverter output voltage waveform and its relation with the input command of level variable.

Here, if the pulse series $a$, $b$, $c$ or $d$ shown in FIG. 2 is used as the gate pulse series to trigger the inverter thyristors, that inverter surely produces the same pulse series as those shown in FIG. 2, except for amplitude.

Thus, it will be understood that a system for producing pulse trains $a$ through $d$ of FIG. 2 in accordance with the technique described with reference to FIGS. 3 and 4 can be used as a control apparatus to cause the PWM thyristor inverter to produce a voltage pulse train analogous to that shown in FIG. 2 which also preserves "continuity" in voltage mean value as well as frequency and phase over operation zones I, II and III, and at zone switch-over points.

Figure 5:
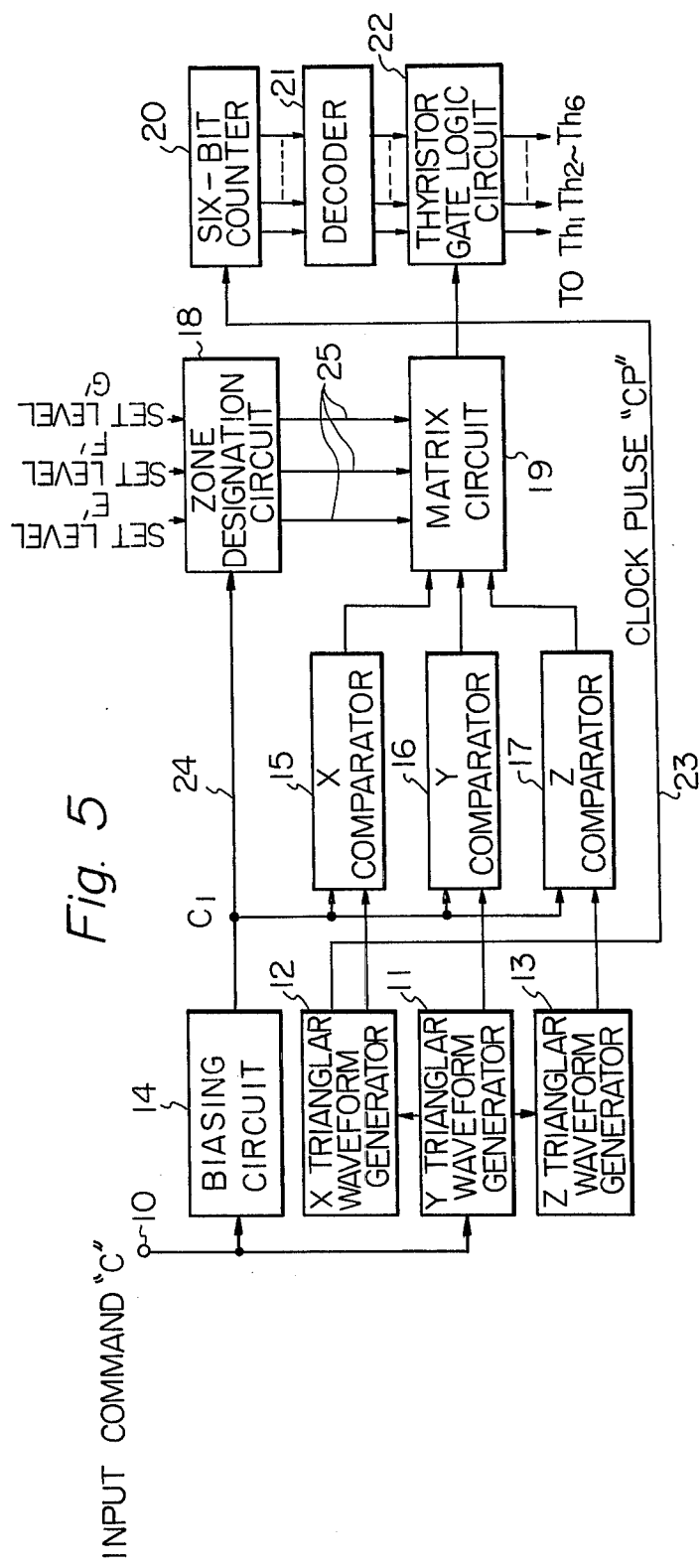
FIG. 5 is a block diagram of an embodical apparatus of the present invention to produce gate pulses for control of the inverter thyristors.

FIG. 5 is a block diagram of an embodical apparatus according to the present invention which produces gate pulses to control the inverter thyristors and which embodies the technique described with reference to FIG. 4.

In FIG. 5, the apparatus receives the input command, C, designating the inverter output frequency at terminal 10. The received input command, C, is applied to a Y triangular waveform generator 11 which produces triangular waveform signal Y shown in FIG. 4, whose repetition frequency is related to the level of the input command, C. Additional X and Z triangular waveform generators 12 and 13 are excited by Y generator 11 to provide triangular waveform signals X and Z, respectively, shown in FIG. 4. Terminal 10 is also coupled to a biasing circuit 14 which produces a modified command $C_1$ having a level slightly higher than the received input command, C, at or around frequency $f_{MIN}$. The purpose of this circuit 14 is to increase the resulting pulse width a little to thereby compensate for a decrease in torque at and around $f_{MIN}$, as already described in connection with FIG. 1. Triangular waveform signals X, Y and Z provided by respective generators 12, 11 and 13 are compared in corresponding X, Y and Z comparators 15, 16 and 17 with the modified or biased command, C, which produce pulse trains analogous to trains $d$, $c$ and $b$ shown in FIG. 4, respectively.

Modified command $C_1$ is also applied to a zone designation circuit 18 which receives three predetermined set levels E', F' and G' that were described in connection with FIG. 4. This circuit 18 performs level-comparison and provides a bit signal indicating which operation zone the inverter should assume, to a matrix circuit 19. Matrix circuit 19 is adapted responsive to the bit signal from the zone designation circuit 18 to gate one of three triangular waveform signals X, Y and Z when the bit signal designates one of operation zones I, II and III, otherwise to prevent passage of the same.

X triangular waveform generator 12 produces also a clock pulse, CP, which is applied to a six-bit counter 20 for defining a basic timing reference. The outputs of counter 20 are applied to a decoder 21 which derives a set of desired timing signals and applies them to a thyristor gate logic circuit 22. The logic circuit 22 combines logically the output of the matrix circuit 19 and the received timing signals from the decoder 21 to provide a set of timed gate signals or pulses, which are applied to corresponding gate terminals of thyristors of a three-phase bridge inverter shown in FIG. 6, for example.

Figure 6:
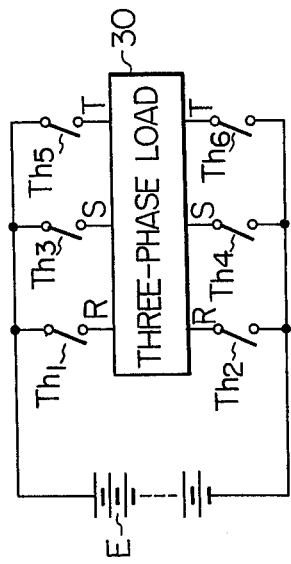
FIG. 6 is a simplified block diagram of a conventional three-phase bridge inverter which will be controlled by gate pulses provided by the circuit shown in FIG. 5.

The simplified main circuit of the three-phase bridge inverter shown in FIG. 6 comprises six thyristors T$h$1 through T$h$6 illustrated as simple switches. D.C. power E is commutated by these thyristors and the resultant A.C. power is supplied to a three-phase load 30. As is well known in the art, in order to surely make the potential across the load 30 zero by a thyristor when it is in the rest time (or when a given A.C. power line voltage is to be zero), pair thyristors T$h$1 and T$h$2, and the like, are desired to be controlled in such a manner that as soon as T$h$1 turns off T$h$2 is surely caused to turn on.

Now, referring to a time chart of FIG. 7, the operation of the apparatus of FIG. 5 will be described in which it is assumed that a given modified command, $C_1$, has a level falling between set levels F' and G' (see FIG. 4) instructing that the inverter should operate in operation zone II to provide five voltage pulses per half cycle.

In FIG. 7, first column $a$ illustrates two triangular waveform signals X and Y generated by X and Y generators 12 and 11 (triangular waveform signal Z is omitted for simplicity of explanation) with the given command, $C_1$, as analogous to FIG. 4, first column $a$. Pulse series $b$ of FIG. 7 is the clock pulse CP derived from X generator 12. Pulse series $c$ and $d$ are outputs of the decoder 21, which are the OR-combination of count-outputs 0, 1 and 2, and another OR-combination of count-outputs 3, 4 and 5, respectively. Similarly, pulse series $e$ is the OR-combination of count-outputs 1 and 4.

Pulse series $f$ is the output of the matrix circuit 19, that is, the output of Y comparator 16. This is because the command, $C_1$, designates operation zone II.

Pulse series $c$ and $d$ define the three-phase reference periods, pulse series $e$ defines the intervals of 60° through 120° and 240° through 300° in electric angle relative to the pulse series $c$ and $d$. These pulse series are combined together with pulse series $f$ provided by the matrix circuit 19 in the logic circuit 22 which provides a set of gate signals for the thyristors, T$h$1 through T$h$6, shown in FIG. 6.

Specifically, pulse series $g$ and $h$ are logically produced by combining additively and subtractively the reference pulse series, $c$ and $d$, with pulse series $f$ masked by pulse series $e$ and, preferably, applied to thyristors T$h$1 and T$h$2, respectively. Another pair of pulse series $i$ and $j$ can be produced similarly by using pulse series $c$, $d$ and $e$ shifted 120° in electric angle forward with pulse series $f$ and are applied to another pair of thyristors, such as T$h$3 and T$h$4. Likely, a pair of gate signal series for thyristors T$h$5 and T$h$6 can be produced by using pulse series $c$, $d$ and $e$ shifted 120° backward or lagged with pulse series $f$.

When pulse series $g$ through $j$ shown in FIG. 7 are applied to thyristors T$h$1 through T$h$4, an output voltage across R and S-phase lines will become as shown by pulse series $k$ in FIG. 7 that has five pulses per half cycle with the quiescent interval of $\pi/6$ (30°) on either end of each half cycle.

The foregoing explanation can similarly be applied to the case where the command, $C_1$, designates operation zone I or operation zone III, except that pulse series $f$ of FIG. 7 will is replaced by the output of X comparator 15 or Z comparator 17, respectively.

Where command $C_1$ has a level designating operation zone IV, the matrix circuit 19 selects none of the outputs of three comparators 15, 16 and 17 to provide the zero level signal. Thus, thyristors T$h$1 and T$h$2 are turned on and off in accordance with pulse series $c$ and $d$ while thyristors T$h$3 and T$h$4 are controlled in accordance with pulse series $c$ and $d$ shifted 120° forward, with the result that a voltage waveform across R and S-phase lines becomes analogous to pulse train $a$ shown in FIG. 2 having the quiescent interval of $\pi/6$ on either end of each half cycle, i.e., a single square waveform.

As described hereinabove, the present invention provides preferred gate pulses for control of the PWM thyristor inverter in response to the input command of level variable.

The process of generating the desired gate pulses comprises the steps of generating three phased series of triangular waveform signals of the same amplitude having respective repetition frequencies proportional to the level of the input command with the repetition frequency ratio of 4:2:1, comparing in terms of level the three triangular waveform series with the input command to generate three series of pulses on the basis of crossover points therebetween, the ratio of pulse width among these pulse series being 1:2:4, selecting one of the three pulse series if the input command designates one of first three predetermined operation zones or a zero level signal if the input command designates a fourth operation zone, and converting the selected pulse series or zero level signal to a desired set of gate pulse series, timed by a clock pulse signal derived from the triangular waveform signals, for control of the thyristor inverter.

In case a three-phase PWM thyristor inverter is to be controlled, three desired sets of gate pulse series having a phase shift of 120° therebetween may be derived at the final step of conversion. Preferably, the number of resulting pulses per half cycle is nine, five, three, or one in correspondence with an increase of the operation frequency of the inverter.

The present invention needs to generate three phased series of triangular waveform signals or employ three triangular waveform signal generators, but, it should be noted that the circuit arrangement is simplified and, importantly, the inverter output voltage mean value as well as frequency and phase varies smoothly without discontinuity in response to level change of the input command even at the point of switch-over of the operation zones so far as the inverter operates in operation zone I, II or III, or when the number of resulting pulses per half cycle is changed between nine, five and three.

What is claimed is:

1. An apparatus for generating gate pulses for control of a PWM thyristor inverter in response to an input command of level variable designating the inverter output frequency, comprising
  a. three triangular waveform signal generators responsive to the input command to generate three phased series of triangular waveform signals the repetition frequencies of which are proportional to the level of the input command and which have the ratio therebetween of 4:2:1,
  b. three comparators for comparing in terms of level the corresponding triangular waveform signal series provided by said generators with the input command to generate corresponding three series of pulses on the basis of crossover points therebetween of which the pulse width ratio therebetween is 1:2:4,
  c. a zone selector circuit for comparing the input command with predetermined zone set levels defining three operation zones to provide a bit signal identifying which one of the three operation zones is to be assumed by the inverter,
  d. a matrix circuit responsive to the bit signal provided by said zone selector circuit to gate one of the three pulse series provided by said three comparators in accordance with the identified operation zone,
  e. a counter and decoder responsive to a clock signal provided by one of said three generators to generate a set of timing reference signals, and
  f. means for converting in response to the reference timing signals provide by said counter and decoder the gated pulse series provided by said matrix circuit to desired gate pulse series for control of the inverter.

2. An apparatus as set forth in claim 1, further including
  g. a biasing circuit receiving the input command for modifying the level of the input command at and around the lower limit frequency of the inverter operation frequency range to supply the thus modified input command to said three comparators and said zone selector circuit.

3. An apparatus as set forth in claim 1, wherein said counter and decoder generates three sets of reference timing signals corresponding to three phases, and said converting means are operable in response to the three sets of reference timing signals to convert the gated pulse series provided by said matrix circuit to three sets of desired gate pulse series for control of a three-phase PWM thyristor inverter.

4. An apparatus as set forth in claim 1, wherein the number of inverter output voltage pulses per half cycle is nine, five and three in correspondence with low, medium and high frequency operation zone.

5. An apparatus as set forth in claim 4, wherein the number of inverter output voltage pulses per half cycle is one if the input command designates an inverter frequency higher than the three operation zones.

6. An apparatus as set forth in claim 1, wherein the inverter output voltage waveform has the quiescent interval of $\pi/6$ in electric angle on either end of each half cycle.

7. A method of generating gate pulses for control of a PWM thyristor inverter in response to an input command of level variable designating the inverter output frequency, comprising the steps of
  a. generating three phased series of triangular waveform signals of the same peak amplitude the repetition frequencies of which are proportional to the level of the input command with the repetition frequency ratio therebetween of 4:2:1,
  b. comparing in terms of level the three generated series of triangular waveform signals with the input command to generate three series of pulses on the basis of crossover points therebetween of which the pulse width ratio therebetween is 1:2:4,
  c. selecting one of the three generated series of pulses in response to which one of three operation zones the input command designates, and
  d. converting the selected pulse series to desired gate pulses for control of the inverter on the basis of timing reference signals derived from the generated triangular waveform signals.

8. A method as set forth in claim 7, wherein, before applying to the steps of comparing and of selecting, the input command is modified in level to increase the inverter output voltage mean value at and around the lower limit frequency of the inverter operation frequency range.

9. A method as set forth in claim 7, wherein the step of converting is effected so as to provide three desired sets of gate pulse series for control of a three-phase PWM thyristor inverter.

10. A method as set forth in claim 7, wherein the number of resulting inverter output pulses is nine, five or three per half cycle of the inverter operation frequency in correspondence with low, medium or high frequency operation zone.

11. A method as set forth in claim 7, wherein the desired gate pulse series generated in the step of converting have the quiescent interval of $\pi/6$ in electric angle on either end of each half cycle of the inverter operation frequency.

* * * * *